United States Patent [19]

Laude

[11] Patent Number: 4,484,793

[45] Date of Patent: Nov. 27, 1984

[54] SWITCHING DEVICE BETWEEN OPTICAL FIBERS

[75] Inventor: Jean-Pierre Laude, Saclas, France

[73] Assignee: Instruments S. A., Paris, France

[21] Appl. No.: 381,664

[22] Filed: May 24, 1982

[30] Foreign Application Priority Data

Jun. 5, 1981 [FR] France ............................ 81 11148

[51] Int. Cl.³ .......................................... G02B 5/172
[52] U.S. Cl. .................... 350/96.20; 350/6.4; 350/96.15; 350/96.18; 350/96.19
[58] Field of Search .................... 350/6.4, 96.15, 96.18, 350/96.19, 96.20, 293, 296, 442, 484

[56] References Cited

U.S. PATENT DOCUMENTS

| | | | |
|---|---|---|---|
| 3,883,223 | 5/1975 | Hudson | 350/96.18 |
| 4,118,109 | 10/1978 | Crawford et al. | 350/484 |
| 4,257,673 | 3/1981 | Matthijsse | 350/96.19 |
| 4,261,638 | 4/1981 | Wagner | 350/96.15 |
| 4,265,513 | 5/1981 | Matsushita et al. | 350/96.20 |
| 4,304,460 | 12/1981 | Tanaka et al. | 350/96.16 |

FOREIGN PATENT DOCUMENTS 167106 12/1981 Japan ............................ 350/96.20

*Primary Examiner*—William L. Sikes
*Assistant Examiner*—Frank González
*Attorney, Agent, or Firm*—Pollock, Vande Sande & Priddy

[57] ABSTRACT

Switching device between optical fibers, for ensuring continuity of transmission between the end of a first fiber (2) and the end of any of a group of other fibers (3). The end of the first fiber (2) is placed at the center (C) of a spherical mirror (1) and the ends of the other fibers (3) are arranged symmetrically relative to the first fiber in the plane perpendicular to the axis and passing through the center (C). The device comprises, between the fibers (2, 3) and the mirror (1), an optically deviating member (5) and means to rotate it on itself about the axis of the mirror (1).

5 Claims, 6 Drawing Figures

SWITCHING DEVICE BETWEEN OPTICAL FIBERS

FIELD OF THE INVENTION

The present invention relates to a switching device for an optical signal between several transmission optical fibers. It is of particular use in the switching operations between subscribers of a telecommunication network.

At the present time, there is rapid development of telecommunications using optical fibers i.e., systems in which the information is conveyed by means of light transmitted by optical fibers, whereas in most presently used systems information is conveyed by means of electric current transmitted by conducting wires.

Whatever the system used, a major problem in a telecommunication network is that of the switching operation, i.e, in selectively connecting a subscriber's telephone with a particular telephone sought from among an often considerable number of other subscribers.

BACKGROUND OF THE INVENTION

In the conventional systems using electric currents, rotary switches have been known and, more recently, electromechanical systems of the "cross-bar" type or solely electronic systems, always aiming to ensure electric continuity between two conductive elements selected from among a number of others.

In systems with light signals transmitted by optical fibers, it is possible to use electronic switches, but they are particularly difficult to construct for operation at the required frequencies. There are also known devices for solely optical switching consisting in putting into direct selective connection two given optical fibers without the aid of an intermediate electronic transformation.

In this case, one solution is to proceed by material displacement of at least one of the fibers to be connected, in order to bring the core of one strictly opposite the core of the other to ensure continuity of light transmission. U.S. Pat. No. 4,204,744 discloses such a solution.

It is alternatively possible to use, between the fibers to be connected, devices for collimation and refocusing, together with intermediate mobile prism systems for displacing the parallel beam in a direction parallel to its own and thus the final point of re-focusing on the core of the receiving fiber.

However, all these devices require high precision mechanical movements. In fact, the core diameter of the most usual optical fibers is between 0.1 and 0.01 mm, for example of the order of 0.05 mm. The relative positioning of the fibers to one another or of a fiber relative to its image must then be ensured with a precision of the order of a micron. Mechanical systems ensuring either the displacement of the fibers themselves or the displacement of the deviating prisms are therefore particularly intricate to construct and consequently very costly.

SUMMARY OF THE INVENTION

The present invention makes it possible to construct a device having a simple mechanical movement of large amplitude, in which the mechanical precision relating to the position of the moving part is very easy to obtain, while ensuring a high efficiency of light transmission between the fibers connected in this way.

The invention thus relates to a switching device between optical fibers, having the object of ensuring continuity of light transmission between the end of a first fiber and the end of any of a group of other fibers.

According to the invention, the end of the first fiber is placed at the center of a spherical mirror, while the ends of the other fibers are arranged, symmetrically relative to the first one, in the plane perpendicular to the axis of the mirror passing through its center, and the device comprises, on the optical path between the fibers and the mirror, at least one optically deviating member provided with means for rotating it on itself about the axis of the mirror.

According to a particular embodiment of the invention, the device comprises only one deviating member consisting of a transparent prismatic plate of small angle, and the first fiber is at the center of a circle where the other fibers are distributed.

BRIEF DESCRIPTION OF THE DRAWINGS

The invention will be better understood by reference to a particular embodiment, given by way of an example and illustrated in the attached drawings.

FIG. 5 uses a transmission diffraction network, while FIG. 6 uses two transparent prismatic plates rotating in opposite directions.

DETAILED DESCRIPTION

Figure 1:
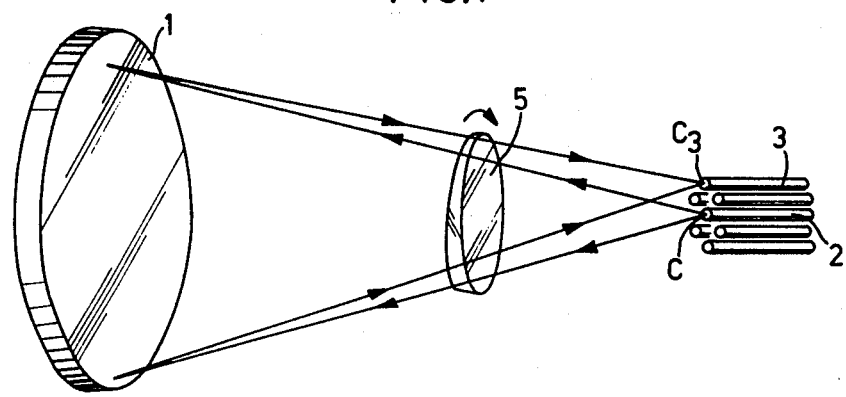
FIG. 1 is a diagrammatical view in perspective of the device.
Figure 2:
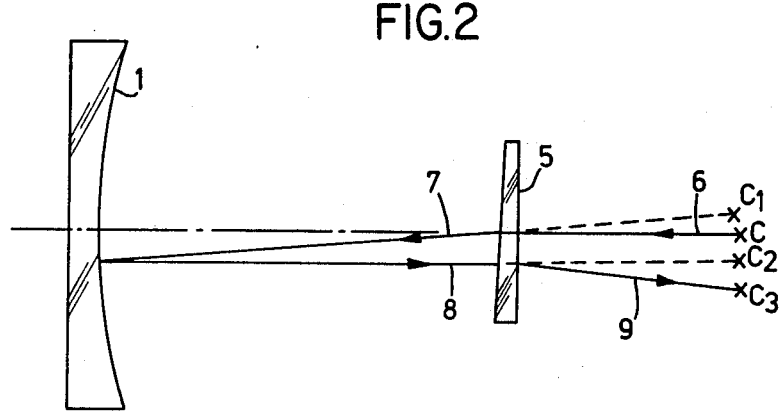
FIG. 2 is an optical diagram thereof.

Referring firstly to FIGS. 1 and 2, the device is shown to comprise a concave spherical mirror 1, whose center of curvature C is placed at the end of a particular optical fiber 2. The fiber 2 is at the center of a bundle of other fibers such as 3 evenly distributed around the central fiber. The signal carried by the light emitted at the end of the fiber 2 must be selectively transmitted to any of the other fibers 3. For this purpose, a transparent prismatic plate 5 of small angle is placed between the mirror 1 and the fibers 2 and 3. The plate 5 can have, for example, an angle of the order of 5°, and preferably has an antireflective coating.

FIG. 2 shows more particularly that a ray 6 issuing from C at the end of the fiber 2 is first deviated along path 7 by the plate 5, coming from the virtual image $C_1$ of C, situated in the plane perpendicular to the axis X of the mirror and passing through the center C. The ray 7 is reflected along path 8 by the mirror, towards $C_2$, symmetrical to $C_1$ relative to C, then again deviated along path 9 by the plate 5 towards $C_3$ situated approximately symmetrical to C relative to $C_2$. The selection of the angle of the plate 5 and of its position along the axis X makes it possible to obtain a final deviation $CC_3$ which corresponds to the distance between the cores of the fibers 2 and 3.

It is possible, by rotating the plate 5 on itself about the axis X, to rotate the image $C_3$ of C along a circle having a center C and a radius $CC_3$, and consequently, by selecting the angular position of the plate 5, it will be possible to send the light beam emitted by the fiber 2 to the chosen fiber 3. Conversely, it will also be possible to send to the fiber 2 any of the signals issuing from any of the fibers 3.

Figure 3:
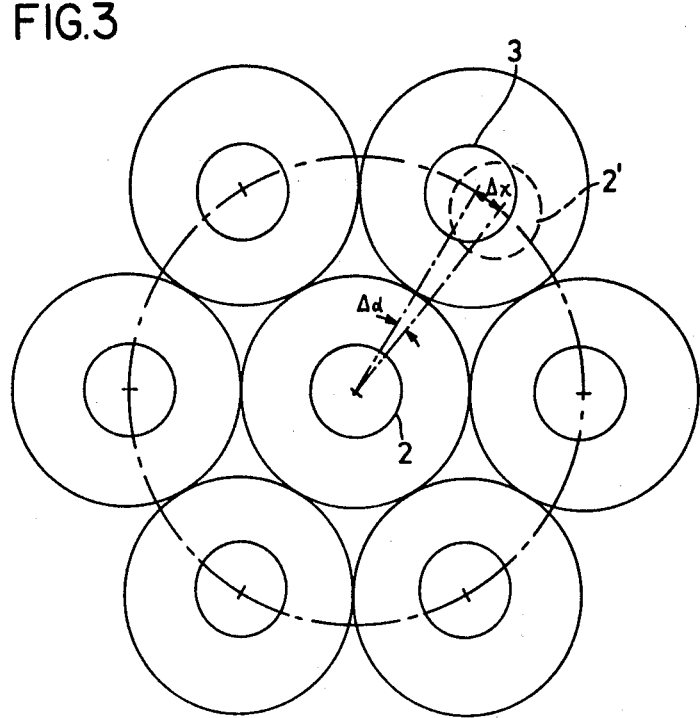
FIG. 3 illustrates, in a particular case of distribution of the fibers, the consequences of a slight angular offset in the position of the rotary prismatic plate.

FIG. 3 illustrates a particularly interesting relative distribution of the fiber 2 and of the other fibers 3. By grouping seven fibers of the same external diameter, with a central fiber being surrounded by six peripheral fibers, it is known that all the external contours are contiguous, and the even distribution of the peripheral fibers is automatically ensured with precision by simple clamping of the bundle of fibers.

It is interesting to work out the degree of precision required for the angular position of the plate 5, so that the efficiency of light transmission is high; this calculation is simpler in the particular configuration of FIG. 3, assuming that identical fibers of a very usual type are used, the external diameter of the sheath being 0.125 mm for a core diameter of 0.05 mm.

The image of the core 2 of the central fiber after reflection on the mirror 1 and two deviations by the plate 5 has been represented in broken lines 2'. If the angular position of the plate 5 is strictly correct, the image 2' coincides strictly with the core 3 and the whole of the light issued from the fiber 2 will be collected and transmitted again via the core of the fiber 3, or vice versa, ensuring the maximum efficiency of transmission. But if there is an angular offset $\Delta\alpha$ between the theoretical position and the real position of the plate 5, there will also be an offset between the circular surfaces 2' and 3 with a linear offset $\Delta x$ between the centers equal to 0.125 $\Delta\alpha$ mm. The transmission efficiency of the device will then be proportional to the common surface of the two circles 2' and 3. It is easy to establish, with the above mentioned numerical conditions, that an angular offsset of the order of 2.5° for the plate 5 only leads to a loss in light transmission of the order of 6%. It is therefore very easy to ensure a high efficiency of transmission, even with a wide angular tolerance which will only require simple and cheap mechanical assemblies.

Figure 4:
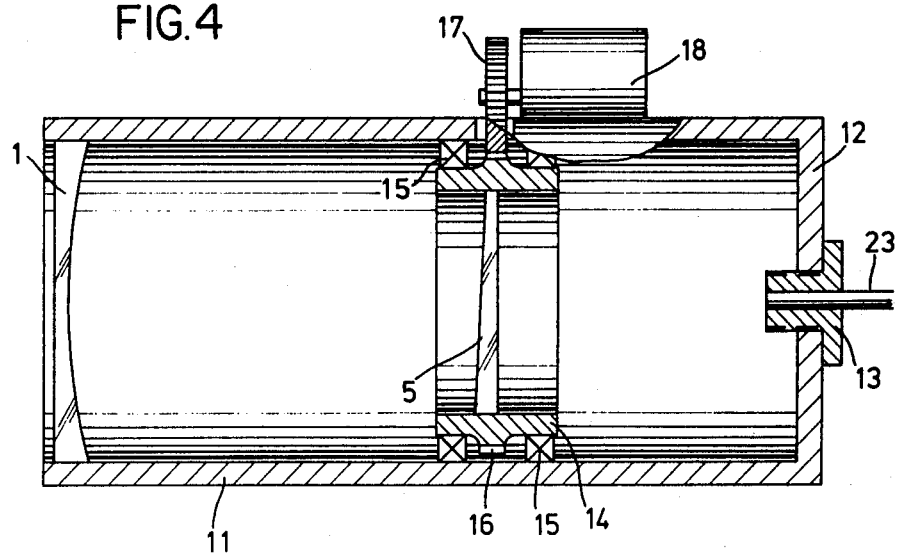
FIG. 4 is a very simplified illustration of an apparatus constructed according to the invention.

FIG. 4 gives, in a very general way, an example of what such a mechanical assembly could be; in this deliberately simplified drawing, it was intended to represent the details of usual technological construction which are within the scope of those skilled in the art.

The apparatus here consists of a tube 11 closed by a bottom 12 at the center of which is screwed a plug carrying the bundle 23 of fibers. The mirror 1 is crimped to the other open end of the tube 11. The plate 5 is carried by a socket 14 which freely rotates inside the tube 11 on the bearings 15. The socket 14 comprises an external gearing 16 engaging a drive pinion 17 which passes through a slot in the wall of the tube. The pinion 17 is driven by a motor-reduction unit 18, provided with the usual controls and with angular indexing means to fix the socket 14 and the plate 5 in the chosen angular positions.

Figure 5:
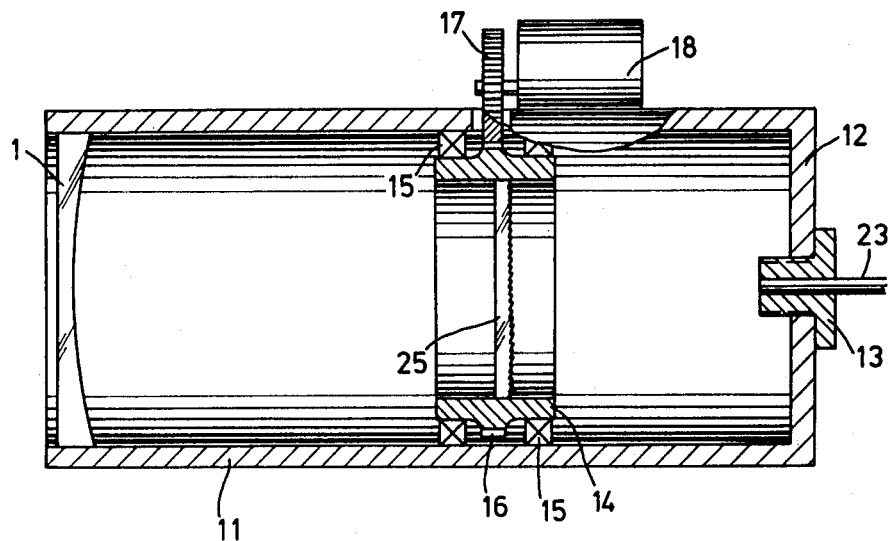
FIGS. 5 and 6 show two variants of the apparatus shown in FIG. 4.

If, monochromatic light is used, as is generally the case in telecommunications, it will be possible to use a transmission diffraction grating instead of the prismatic plate, which will lead to the same deviation effect. This is shown in FIG. 5, which is comparable to FIG. 4, but in which the optical deviation element is constituted by a grating 25.

Two deviating members in series could also be used, namely gratings or prismatic plates, having the same characteristics, but inverted, and they could be rotated with angular synchronization but in opposite direction; the displacement of the image 2' of the core of the fiber 2 would then be rectilinear. It would be sufficient to arrange the various fibers 3 on a line, symmetrically on both sides of the fiber 2, and still in the plane perpendicular to the axis X of the mirror.

Figure 6:
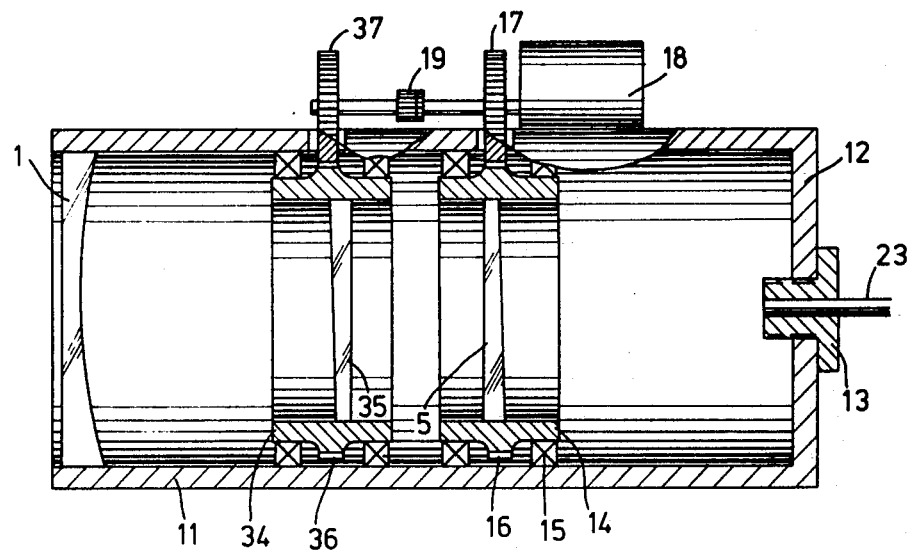

This variant is illustrated in FIG. 6, wherein tube 11 carries two bushings 14 and 34 whose exterior teeth 16 and 36 engage drive pinions 17 and 37, which are driven by the same motor 18 at the same angular speed but in opposite directions by means of reversing pinions 19. Each bushing 14 and 34 carries a transparent prismatic plate 5 and 35; these are identical but angularly displaced at 180° relatively to one another.

It will be understood that plates 5 and 35 may be replaced by transmission diffraction networks.

Finally, the same apparatus, described as a switch with stopping of the plate 5 in determined angular positions, can also be used for time multiplexing by continuously rotating the prismatic plate.

I claim:

1. A switching device between optical fibers for ensuring continuity of light transmission between the end of a first fiber (2) and the end of any of a group of other fibers (3), wherein the end of said first fiber (2) is placed at the center of radius of curvature (C) of a spherical mirror (1) while the ends of said other fibers (3) are arranged symmetrically relative to said first fiber, in the plane perpendicular to the axis (X) of said mirror and passing through said center (C), said device comprising, on the optical path between said first fiber (2) and said other fibers (3) and said mirror (1), at least one optically deviating member (5), operating in transmission, provided with means (17, 18) for rotating it on itself about the axis of said mirror.

2. A device as claimed in claim 1, comprising only one deviating member (5), wherein said other fibers (3) are distributed on a circle centered on said first fiber (2).

3. A device as claimed in claim 1, comprising two optically deviating members having opposed deviation characteristics, each member being driven with angular synchronization but in opposite direction, and wherein said other fibers (3) are arranged in a straight line on both sides of said first fiber (2).

4. A device as claimed in any one of claims 1 to 3, wherein each deviating member is a transparent prismatic plate of small angle.

5. A device as claimed in any one of claims 1 to 3, in the case where monochromatic light is used, wherein each deviating member is a transmission diffraction grating.

* * * * *